(12) United States Patent
Albertini et al.

(10) Patent No.: US 6,212,954 B1
(45) Date of Patent: Apr. 10, 2001

(54) IMPACT TEST APPARATUS

(75) Inventors: Carlo Albertini, Ispra; Kamel Labibes, Angera, both of (IT)

(73) Assignee: European Community (LU)

( * ) Notice: Subject to any disclaimer, the term of this patent is extended or adjusted under 35 U.S.C. 154(b) by 0 days.

(21) Appl. No.: 09/319,807

(22) PCT Filed: Sep. 26, 1997

(86) PCT No.: PCT/EP97/05433

§ 371 Date: Jul. 26, 1999

§ 102(e) Date: Jul. 26, 1999

(87) PCT Pub. No.: WO98/26268

PCT Pub. Date: Jun. 18, 1998

(30) Foreign Application Priority Data

Dec. 12, 1996 (EP) .................................................. 96309086

(51) Int. Cl.⁷ .................................................. G01M 7/00
(52) U.S. Cl. ........................ 73/662; 73/12.01; 73/12.09
(58) Field of Search .......................... 73/662, 570, 11.01, 73/12.01, 12.09

(56) References Cited

U.S. PATENT DOCUMENTS

| | | | |
|---|---|---|---|
| 2,474,235 | * 6/1949 | Dresser et al. | 73/12.09 |
| 5,003,811 | * 4/1991 | Shannon et al. | 73/12 |
| 5,184,499 | * 2/1993 | Oppliger et al. | 73/11.01 |

OTHER PUBLICATIONS

Patent Abstracts of Japan vol. 007, No. 035 (P–175), Feb. 10, 1983 disclosing JP 57 187635 A (Mitsubishi Jukogyo KK), Nov. 18, 1982, (see abstract).

* cited by examiner

*Primary Examiner*—Richard A. Moller
(74) *Attorney, Agent, or Firm*—Welsh & Katz, Ltd.

(57) ABSTRACT

A compression wave or pulse generation apparatus and method are capable of generating a compression wave or pulse in a vehicle or large structure under test, and include an impactor bar or member held during use adjacent one end of the vehicle or large structure under test and supported to resist movement in a direction away from the large vehicle or structure. The impactor bar is preloaded in the direction away from the vehicle by a hydraulic or pneumatic actuator. In use, the preload force can be quelled suddenly, for example, by triggering an explosive bolt in the impactor bar, so that the impactor bar is released into impact or energy transfer with the vehicle or large structure under test to transmit a compression wave or pulse through the vehicle or structure. Energy flow transducers in the form of elongated bar members are selectively arranged to measure the mechanical energy propagated along the vehicle or structure subjected to the stress wave under simulated crash conditions.

16 Claims, 2 Drawing Sheets

IMPACT TEST APPARATUS

BACKGROUND OF THE INVENTION

This invention relates to improvements in or relating to test apparatus and is more particularly concerned with apparatus which allows different crash scenarios to be simulated in an attempt to optimise factors for better safety performance of the structure under test.

Generally, in order to test the safety of large-scale structures such as motor vehicles, road safety barriers, large aeroplanes, space capsules or shuttles, high speed train bodies or crash combinations (for example two vehicles or a vehicle and barriers) the normal procedure would be to guide the structure under test in front of a specially constructed wall or barrier or other vehicle. Measurements would then be taken from transducers or gauges positioned on the structure under test. Certainly, in the case of aeroplanes such tests can be very complex and expensive and tend to be subject to high risks of failure.

An object of the present invention is to alleviate the aforementioned, or other, problems associated with crash tests more particularly for large structures.

SUMMARY OF THE INVENTION

According to one aspect of the present invention there is provided compression wave or pulse generation apparatus capable of generating a compression wave or pulse in a vehicle or large structure under test, said compression wave generation apparatus comprising an impactor bar or member held, in use, adjacent one end of the vehicle or large structure under test and supported to resist movement in a direction away from said vehicle or large structure when the impactor bar/member is preloaded in said direction by actuator means, the arrangement being such that, in use, the preload force can be quelled suddenly for example by triggering an explosive bolt in the impactor bar/member, so that the impactor bar/member is released into impact or energy transfer with the vehicle or large structure thereby transmitting a compression wave or pulse through the vehicle or large structure.

Usually, the apparatus will include energy flow transducers arranged to measure the mechanical energy propagated along the structure or vehicle submitted to the stress wave under simulated crash conditions.

Preferably, the transducers are in the form of bars or elongate members arranged, in use, to measure stress values at selected (critical) points of the structure. Preferably, each bar has the same mechanical impedance as the part of the structure being measured by that bar and/or the length of the transducer bar is such as to prevent wave reflection (at the end of the bar remote from the point of the structure to which the transducer bar is connected) before the end of the measuring time period.

Usually, the apparatus will include transducer bars arranged longitudinally of the vehicle or structure under test in addition to transducer bars arranged at an angle or transversely of said vehicle or structure under test.

The actuator means is preferably a hydraulic or pneumatic actuator.

Usually, said apparatus will be arranged to generate a well known compression pulse.

In one embodiment of the apparatus the impactor bar/member is generally cylindrical and provided with an explosive bolt positioned diametrically of a lesser diameter portion (usually closer to the actuator means than to the structure under test). The impactor bar/member may be shaped to match the contour of the structure under test and said bar/member is held adjacent the structure by means of a blocking system or fixed support, a wider diameter portion of the bar/member engaging the blocking system or fixed support when the impactor bar/member is subject to pre-load conditions in a direction away from the structure under test.

According to a further aspect of the present invention there is provided compression wave or pulse generation apparatus capable of generating a compression wave or pulse in a vehicle or large structure under test, in combination with said vehicle or large structure equipped with transducer bars or members (preferably arranged both longitudinally and transversely of the vehicle/large structure) said transducer bars or members being positioned to collect wave propagation data from selected or critical points of the structure.

Further advantageous features of the compression wave or pulse generation apparatus will be evident from the following description and drawings.

Two embodiments of compression wave or pulse generation apparatus in accordance with the present invention will now be described, by way of example only, with reference to the accompanying, much simplified diagrammatic drawings in which:

DETAILED DESCRIPTION

Figure 1:
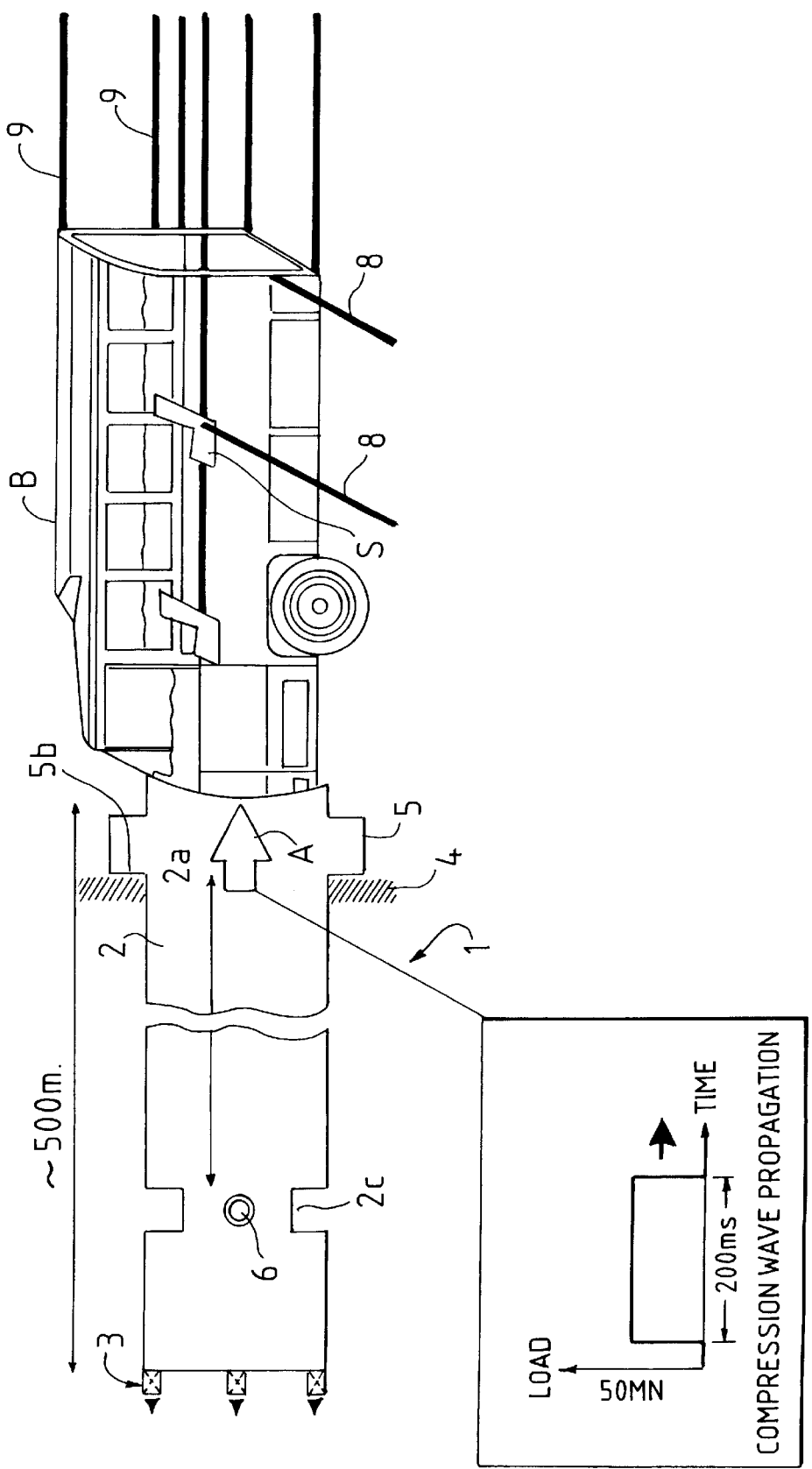
FIG. 1 shows a view of a first embodiment of compression wave generation apparatus utilised to generate a compression wave in a vehicle bus structure.

Referring to FIG. 1 of the drawings, compression wave or pulse generation apparatus 1 comprises an impactor bar or member 2 having a right-hand end surface 2a appropriately curved or shaped to match the front of a vehicle bus B, which is the structure under test. The impactor bar or member 2 can be preloaded in a direction which is reverse to arrow A by a hydraulic or pneumatic actuator 3. When the impactor bar or member 2 is preloaded in said reverse direction, blocking or support system 4 prevents movement of the impactor bar to the left in FIG. 1 (by engagement of the rear surface 5b of the larger diameter flange 5 located towards the right-hand end of the impactor bar or member 2, just in front of the blocking system 4) in a manner which should be evident from the drawings. The impactor bar or member 2 is generally cylindrical and includes a reduced diameter portion 2c in which is located transversely (i.e. diametrically) an explosive bolt 6. Thus, if the bolt 6 is exploded when the impact bar 2 is subject to pre-load by the actuator 3 the reduced diameter portion 2c shatters and the end 2a of the impactor bar is thus propelled suddenly into impact or energy transfer with the vehicle bus structure B thereby transmitting a compression wave or pulse through the structure B, in a manner which should be self-evident. Thus, the impactor bar or member 2 acts as an elastic energy accumulator and crash wave transmitter.

The mechanical energy propagates along the structure B, the compression stress wave simulating a crash condition. The structure B is not homogeneous and consists of components of different geometry and different materials so that the mechanical energy propagates stress waves inside the structure by taking the easiest route or the route which offers least resistance. This flow of energy corresponding to a packet of waves can be evaluated by numerical simulation but no experimental results exist to validate such theoretical results. By using the apparatus as described in relation to FIG. 1 such experimental results can be obtained and compared with theory.

In order to obtain such experimental results transducer bars are located at appropriate points (critical points) of the structure B under test. Transducers 8 are arranged transversely of the structure B and transducers 9 are arranged longitudinally of the structure. The transducer bars 8,9 are instrumented with strain gauges (not shown) to locally drain and collect with precision the local flow of energy which passes through a particular critical point of the structure B. The structure B can be cut crosswise of the section where there is a need for collecting data. Each transducer bar is arranged to have the same mechanical impedance as the part of the structure which it tests. The length of the transducer bar 8,9 should be long enough in each case to prevent the reflection of the compression wave at the opposite end of the bar, before the end of the measuring time period. One of the transducer bars 8 is connected to a seat S (body in white) of the vehicle and thus the seat S can be tested via said transducer without the other elements of the structure (wheels, motor, other seats and so on).

FIG. 1 also shows graphically the compression wave propagation that takes place in direction of arrow A, the content of which should be self-explanatory.

Using the apparatus as shown in FIG. 1, a considerable advantage in testing the structure of the bus B is that the bus itself does not need to be moved before the test so that measures realised by different sensors are facilitated. Furthermore, a known energy content may be introduced at the front end of the vehicle bus so that it is possible to measure the flow of energy at a cross section of the structure by means of the energy flow transducers 8 and 9.

It is advantageous that large scale structures can be tested and submitted to a crash scenario with precision and with lower costs than simulating a real accident. The apparatus as shown in FIG. 1 may provide very large deformation to the structure (for example 5 meters at a constant strain rate).

The energy flow transducers 8 and 9 may be existing transducers which can give a substantially, simultaneous direct measurement of load, displacement, speed and acceleration in any selected section of the structure, due to their capability of collecting (whilst remaining in the elastic state) the part of the compression wave or pulse arriving at the particular point of the structure being measured without said part of the pulse having been modified or distorted. Such a capability opens a pathway to a greater insight into the local behaviour of large structures. Thus, the energy flow transducers may provide for precise experimental stress and strain analysis in any point of a structure subjected to impact loading.

Figure 2:
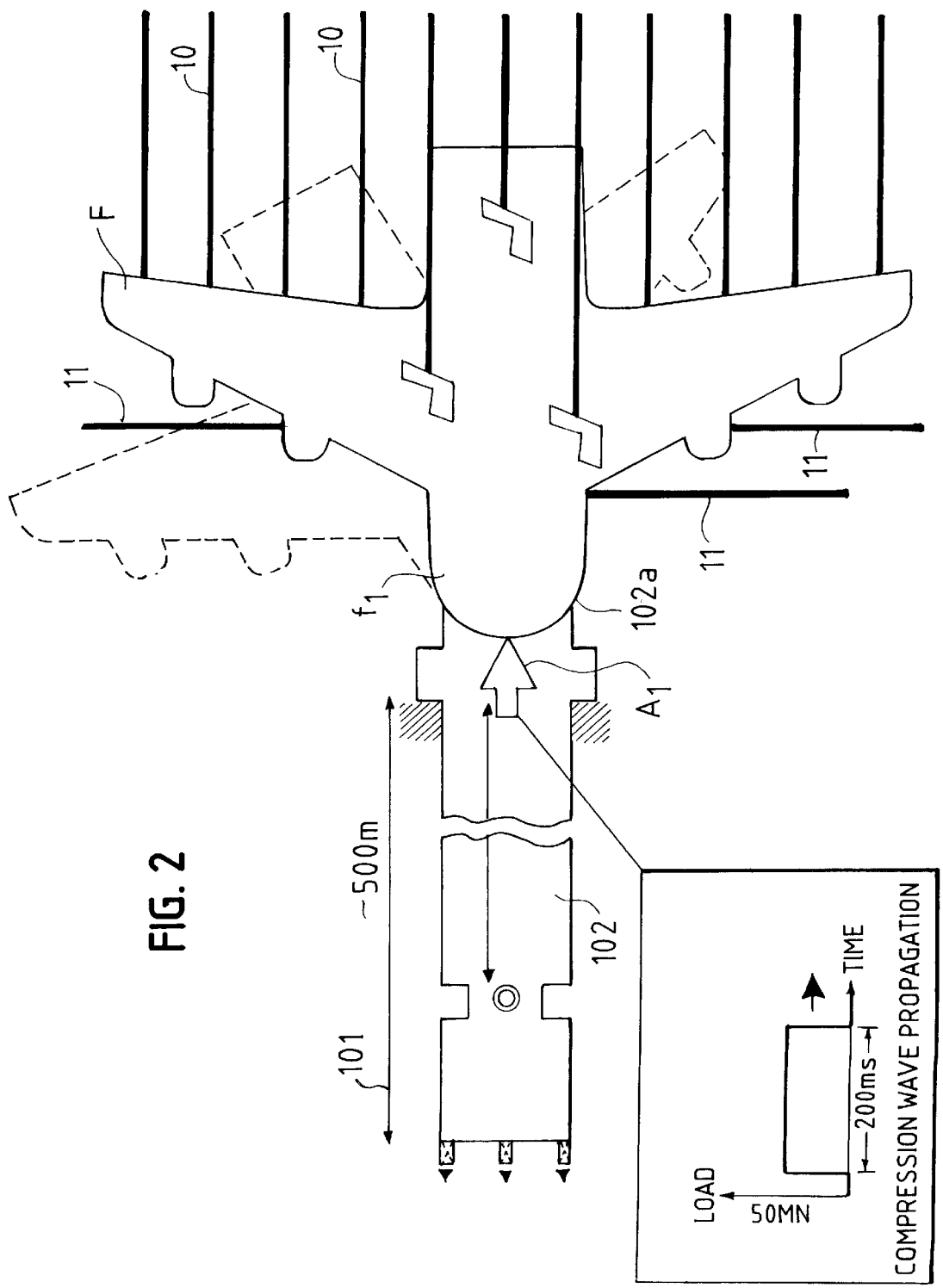
FIG. 2 shows a second embodiment of compression wave generation apparatus utilised to generate a compression wave in an aeroplane.

FIG. 2 shows a second embodiment of compression wave generation apparatus 101 which is very similar to the arrangement 1 shown in FIG. 1 except that the front end 102a of the impact bar or member 102 is now shaped to match the front end of fuselage $f_1$ of an aeroplane F. Transducer bars 10 and 11 are arranged parallel with the axis of the fuselage and transverse thereto as should be evident from the FIGURE in order to take readings from critical points of the structure. A compression wave is generated in the direction of arrow $A_1$ in a manner similar to generation in FIG. 1 and accordingly a similar graphical result is shown for the compression wave propagation.

By using the compression wave or pulse generation apparatus 1 and 101 in conjunction with an appropriate array of transducers 8,9,10,11, experimental results can be obtained which may be compared with or validate theoretical results. It is to be appreciated that there is a need to obtain such results before modifying a part of a large-scale structure such as a bus or aeroplane but that hitherto there has been no means for taking appropriate measurements of the flow of energy through the structure. Thus, advantageously, the compression wave or pulse generation apparatus 1 and 101, in combination with a specific transducer array integrated into the large scale structure under test, could be thought of as a precision transducer for optimisation of safety performance of the structure under test. The testing method involves elastic and plastic stress wave propagation measurements in the large-scale structure by the introduction of a well known compression pulse which allows a crash test to be simulated.

Overall, it is believed that the present invention is advantageous in the following ways:

(1) Providing the concept of a precision impulsive testing device of large mechanical structure where the input energy, its distribution and its flow in different points of the large structure can be measured with respect to the fundamentals of wave propagation physics.

(2) The manner in which a large amount of potential energy is accumulated and transferred as a dynamic compression pulse of very well defined parameters (pressure, duration, displacement) without inertial movements taking place through the system but with cumulative elastic particle displacements.

(3) The provision of energy flow transducers having the same mechanical impedance of the structural member which they are testing, such transducers, therefore, being able to measure precisely the mechanical characteristics of any selected point of a structure in the presence of wave propagation.

(4) The manner in which the energy flow transducers have a unique characteristic of yielding a contemporaneous direct measurement of load, displacement, speed and acceleration. The energy flow transducers capture, without modification the pulse arriving at the structural member on which they are applied because they remain elastic and have sufficient length to avoid the superposition of end reflections on the original pulse.

The shape of the impactor bars or energy accumulators 2 and 102 could be modified according to the particular wave shape needed. The duration of the wave is a function of the length of the energy accumulator and the amplitude could be modified by the modification of the acoustic impedance along the energy accumulator. The explosive bolt 6 is the weak part of the energy accumulator and when this part is broken energy is released. The most convenient way to release the energy is to insert inside the bolt an explosive which allows rupture of the bolt in a very short time. In this manner a stress wave with a short rise time can be provided.

It is to be understood that the scope of the present invention is not to be unduly limited by a particular choice of terminology and that a specific term may be replaced by any equivalent or generic term. Further, it is to be understood that individual features, method or functions relating to the compression wave or pulse generation apparatus or transducer array might be individually patentably inventive. The singular may include the plural and vice versa. Additionally, any range mentioned herein for any variable or parameter shall be taken to include a disclosure of any derivable sub-range within the range or any particular value of the variable or parameter arranged within, or at an end of, the range or sub-range. As an alternative, it is possible that a wave or signal other than a compression wave is induced in the structure under test.

Further according to the present invention there is provided a method of generating a compression wave or pulse in a vehicle or large structure under test and evaluation of that compression wave or pulse in said vehicle or structure, said method comprising pre-loading an impactor bar or member held adjacent said vehicle or structure under test, in a direction away from said vehicle or structure, suddenly quelling the pre-load force, for example by triggering an explosive bolt in the impactor bar/member, thereby releasing the impactor bar/member into impact or energy transfer with the vehicle or large structure and transmitting a compression wave or pulse through the vehicle or large structure, said method comprising collecting data from selected or critical points of the structure by means of transducer bars or members extending from said critical points (and preferably extending both longitudinally and transversely of the vehicle or structure) and analysing said data collected.

Preferably, the method involves collecting measurement data from the transducer bars or members before wave reflection takes place at the associated end of the transducer bar remote from the critical or selected point of the test area. Preferably, said method involves the transducer bars or members having the same mechanical impedance as the part of the structure to be measured by said transducer bar/member.

The use of elastic bars to measure the stress values at one interface of a specimen is well known in Hopkinson bar theory based on the difference of mechanical impedance between the specimen and the bars; stress values in structures can also be measured and the result obtained may correspond to the mechanical response of the whole structure to a crash test.

However, if the mechanical impedance of the bars is greater than the mechanical impedance of the structure (as in the case of the Hopkinson bar technique), the stress wave is divided into a transmitted wave which propagates along the bar and a reflected one which propagates in the structure. In the case of embodiments of the present invention no difference of mechanical impedance should exist, which should thereby prevent reflections at the interface. Thus, all the energy propagated may be captured and drained along the transducer bars and by this means it is ensured the stress waves values measured on the transducer bars correspond to the energy which has reached the interface and which would continue to propagate along the rest of the structure.

What is claimed is:

1. Compression wave or pulse generation apparatus capable of generating a compression wave or pulse in a vehicle or large structure under test, said compression wave generation apparatus comprising an impactor bar or member held, in use, adjacent one end of the vehicle or large structure under test and supported to resist movement in a direction away from said vehicle or large structure, characterized in that the impactor bar/member is preloaded in said direction by actuator means, said apparatus being arranged such that, in use, the preload force can be quelled suddenly, for example, by triggering an explosive bolt in the impactor bar/member, so that the impactor bar/member is released into impact or energy transfer with the vehicle or large structure to transmit a compression wave or pulse through the vehicle or large structure.

2. Apparatus as claimed in claim 1 having energy flow transducers arranged to measure the mechanical energy propagated along the structure or vehicle (R) submitted to the stress wave under simulated crash conditions.

3. Apparatus as claimed in claim 2 in which the transducers are in the form of bars or elongate members arranged, in use, to measure stress values at selected points of the structure (B1).

4. Apparatus as claimed in claim 3 in which each bar has the same mechanical impedance as the part of the structure (B) being measured by that bar.

5. Apparatus as claimed in claim 3 in which the length of each transducer bar is such as to prevent wave reflection at the end of the bar remote from the point of the structure to which the transducer bar is connected before the end of the measuring time period.

6. Apparatus as claimed in claim 3 in which at least one of said transducer bars is arranged longitudinally of the vehicle or structure under test, and at least one of said transducer bars is arranged at an angle or transversely of said vehicle or structure under test.

7. Apparatus as claimed in claim 1 in which the actuator means includes a hydraulic or pneumatic actuator.

8. Apparatus as claimed in claim 1 wherein said apparatus is operative therefor to generate a known compression pulse.

9. Apparatus as claimed in claim 1 in which the impactor bar/member is generally cylindrical and provided with an explosive bolt positioned diametrically of a lesser diameter portion.

10. Apparatus as claimed in claim 1 in which the impactor bar/member is shaped to match the contour of the structure under test and said bar/member is held adjacent the structure by means of a blocking system or fixed support, a wider diameter portion or flange of the bar/member engaging the blocking system or fixed support when the impactor bar/member is subject to pre-load conditions in a direction away from the structure under test.

11. Compression wave or pulse generation apparatus capable of generating a compression wave or pulse in a vehicle or large structure under test, in combination with said vehicle or large structure equipped with transducer bars or members positioned to collect wave propagation data from selected or critical points of the structure.

12. The combination as claimed in claim 11 in which the transducer bars or members are arranged both longitudinally and at an angle or transversely of the vehicle/large structure.

13. A method of generating a compression wave or pulse in a vehicle or large structure under test and evaluation of that compression wave or pulse in said vehicle or structure, said method comprising the steps of pre-loading an impactor bar or member held adjacent said vehicle or structure under test, in a direction away from said vehicle or structure, suddenly quelling the pre-load force, for example by triggering an explosive bolt in the impactor bar/member thereby releasing the impactor bar/member into impact or energy transfer with the vehicle or large structure and transmitting a compression wave or pulse through the vehicle or large structure, collecting data from selected or critical points of the structure by means of transducer bars or members extending from said critical points, and analyzing said data collected.

14. A method as claimed in claim 13 in which the transducer bars or members extend both longitudinally and at an angle or transversely of the vehicle or structure.

15. A method as defined in claim 13 wherein said transducer bars comprise elongated bars having opposite ends, said step of collecting data from selected or critical points of the structure including collecting measurement data from the transducer bars or members before wave reflection takes place at the associated ends of the transducer bars remote from the critical or selected points of the structure.

16. A method as claimed in any one of claim 13 in which the transducer bars or members have the same mechanical impedance as the part of the structure to be measured by said transducer bar/member.

* * * * *